United States Patent [19]
Swan et al.

[11] Patent Number: 6,008,858
[45] Date of Patent: Dec. 28, 1999

[54] VIDEO TIMING GENERATION

[75] Inventors: Philip L. Swan, Toronto; Antonio A. Rinaldi, Maple, both of Canada

[73] Assignee: ATI Technologies, Inc, Thornhill, Canada

[21] Appl. No.: 08/761,590

[22] Filed: Dec. 6, 1996

[51] Int. Cl.[6] .................................................. H04N 5/05
[52] U.S. Cl. ............................................ 348/523; 348/521
[58] Field of Search .................................... 348/521, 522, 348/523

[56] References Cited

U.S. PATENT DOCUMENTS

| | | | |
|---|---|---|---|
| 4,316,219 | 2/1982 | Smith et al. | 348/523 |
| 4,392,159 | 7/1983 | Leomoine et al. | 386/12 |
| 4,399,459 | 8/1983 | Mulvanny et al. | 348/523 |
| 4,631,586 | 12/1986 | Gennetten et al. | 348/495 |
| 4,737,778 | 4/1988 | Nishi | 345/121 |
| 4,742,350 | 5/1988 | Ko et al. | 345/516 |
| 4,811,098 | 3/1989 | Kurakake et al. | 348/712 |
| 4,814,875 | 3/1989 | Oldershaw | 348/521 |
| 4,926,166 | 5/1990 | Fujisawa et al. | 345/3 |
| 4,958,227 | 9/1990 | Wan | 348/523 |
| 5,021,872 | 6/1991 | Shiratsuchi | 348/505 |
| 5,025,496 | 6/1991 | Canfield | 348/526 |
| 5,036,401 | 7/1991 | Antonov et al. | 348/26 |
| 5,124,804 | 6/1992 | Socarras | 348/524 |
| 5,262,861 | 11/1993 | Herz | 348/521 |
| 5,282,020 | 1/1994 | Tanaka | 348/524 |
| 5,305,106 | 4/1994 | Fukushima et al. | 348/521 |
| 5,339,111 | 8/1994 | Park | 348/524 |
| 5,489,945 | 2/1996 | Kannegundla et al. | 348/521 |
| 5,574,752 | 11/1996 | Juri | 375/354 |
| 5,581,303 | 12/1996 | Djabbari et al. | 348/524 |
| 5,628,025 | 5/1997 | Chung et al. | 395/800.09 |
| 5,765,010 | 6/1998 | Chung et al. | 395/800.01 |
| 5,786,867 | 7/1998 | Suh | 348/521 |

OTHER PUBLICATIONS

Keith Jack, *Video Demystified*, A Handbook for the Digital Engineer, Second Edition, Chapter 5, NTSC/PAL Aug. 1996.

Digital Encoding, pp. 132–232, Copyright © 1996 by High-Text Interactive, Inc., San Diego, CA 92121.

*Primary Examiner*—John K. Peng
*Assistant Examiner*—Stephen Thomas Boughner

[57] ABSTRACT

The invention features the generation of timing signals for use in the generation of a video signal. Vertical timing codes and horizontal timing codes are stored in a memory. The horizontal timing codes define regions of at least two types of horizontal timing signals of the video signal, and the vertical timing codes define the timing of the horizontal timing signals. The vertical and horizontal timing codes are stepped through to generate at least one signal indicative of the timing of the horizontal timing signals.

19 Claims, 22 Drawing Sheets

| HORIZONTAL STATE | DESCRIPTION |
| --- | --- |
| HSTATE0 | SYNC. LEVEL |
| HSTATE1 | BLANK LEVEL |
| HSTATE2 | BLACK LEVEL |
| HSTATE3 | ACTIVE REGION 31 |
| HSTATE4 | LAST REGION OF NORMAL HORIZONTAL TIMING; END AT SYNC. LEVEL AND DECREMENT VERTICAL REGION COUNTER (TVV COUNT) |
| HSTATE5 | COLOR BURST REGION 29 |
| HSTATE6 | MAINTAIN PREVIOUS HORIZONTAL STATE |
| HSTATE7 | ACTIVE REGION AND DECREMENT VERTICAL REGION COUNTER (TVV COUNT) |

FIGURE 9

| HORIZONTAL STATE | DESCRIPTION |
| --- | --- |
| VSTATE0 | NORMAL END OF FRAME; MAINTAIN PREVIOUS VERTICAL STATE, RECORD VVALUE_ADR WITH MAX_UV_ADDR |
| VSTATE1 | SHORT REGULAR HORIZONTAL TIMING SIGNAL; MAINTAIN PREVIOUS VERTICAL STATE |
| VSTATE2 | LONG REGULAR HORIZONTAL TIME SIGNAL; MAINTAIN PREVIOUS VERTICAL STATE |
| VSTATE3 | SERRATION PULSE SIGNAL |
| VSTATE4 | EQUALIZATION PULSE SIGNAL |
| VSTATE5 | REGULAR HORIZONTAL TIMING SIGNAL WITHOUT SETUP, ACTIVE SIGNAL 32, AND COLOR BURST 34; WITH BLANK LEVEL |
| VSTATE6 | REGULAR HORIZONTAL TIMING SIGNAL WITH ONLY BLANK LEVEL AND COLOR BURST 34 |
| VSTATE7 | REGULAR HORIZONTAL TIMING SIGNAL WITH ALL LEVELS AND REGIONS EXCEPT FOR ACTIVE SIGNAL 32 |
| VSTATE8 | REGULAR HORIZONTAL TIMING SIGNAL WITH ALL REGIONS AND LEVELS |
| VSTATE9 | REGULAR HORIZONTAL TIMING WITH ALL REGIONS AND LEVELS EXCEPT FOR COLOR BURST 34 |
| VSTATE10 | MAINTAIN PREVIOUS STATE; GENERATE INTERRUPT |
| VSTATE11 - VSTATE15 | RESERVED |

FIGURE 10

| REG. HOR. STATE | SER. STATE | EQU. STATE | LENGTH |
| --- | --- | --- | --- |
| 0 | 0 | 0 | 8 |
| 0 | 0 | 0 | 64 |
| 0 | 0 | 1 | 100 |
| 1 | 0 | 1 | 28 |
| 5 | 0 | 1 | 108 |
| 1 | 0 | 1 | 64 |
| 2 | 0 | 1 | 120 |
| 3 | 0 | 1 | 511 |
| 3 | 0 | 1 | 134 |
| 7 | 1 | 1 | 200 |
| 3 | 0 | 0 | 100 |
| 3 | 0 | 1 | 511 |
| 3 | 0 | 1 | 511 |
| 3 | 0 | 1 | 43 |
| 3 | 1 | 1 | 70 |
| 2 | 1 | 1 | 80 |
| 1 | 1 | 1 | 50 |
| 4 | 0 | 0 | 28 |

FIG. 11

| VERTICAL STATE | LENGTH |
| --- | --- |
| 7 | 1 |
| 7 | 3 |
| 8 | 440 |
| 7 | 23 |
| 4 | 6 |
| 3 | 6 |
| 4 | 6 |
| 6 | 24 |
| 7 | 21 |
| 8 | 440 |
| 7 | 22 |
| 4 | 6 |
| 3 | 6 |
| 4 | 6 |
| 6 | 24 |
| 7 | 14 |
| 0 | 2 |

FIG. 12

VIDEO TIMING GENERATION

BACKGROUND OF THE INVENTION

The invention relates to video timing generation.

As shown in FIG. 1, a video image is typically generated on a television screen 10 by projecting three electron beams (one for red, green, and blue) onto a phosphor coating on the back of the screen 10. Each electron beam traverses a predetermined pattern across the screen 10, and the time varying intensity of the electron beam (i.e., the number of electrons striking the phosphor coating) modulates the intensity of light emitted by the phosphor coating.

The predetermined pattern includes horizontal scan lines 12 with the first scan line 12 having an origin at a point 16 at the upper left corner of the screen 10. Each scan line 12 has a slight downward incline from the left to the right of the screen 10. Once the electron beam reaches the far right of the screen 10 (and current scan line 12), the electron beam traverses horizontal retrace lines 14 to move the electron beam back to the far left of the screen 10.

For noninterlaced video, once the electron beam reaches a point 18 at the bottom of the screen 10, the top-to-bottom scan, or field, and the video image, or frame, are complete. Each electron beam then returns to the point 16 via a vertical retrace line (not shown). For interlaced video, a frame is formed from multiple successive scans of the electron beam from the top of the screen 10 to the bottom, i.e., multiple fields are used.

A typical video signal typically has horizontal timing signals which contain image information for controlling the three electron beams. The type of horizontal timing signal appearing in the video signal is a function of a vertical timing of the video signal. As shown in FIG. 2, the video signal may be divided into three fundamental types of horizontal timing signals: a regular horizontal timing signal 35, a serration pulse signal 36, and an equalization pulse signal 37.

Within the regular horizontal timing signal 35 an active signal 32 (in an active region 31) contains the information for one scan line 12. The time-varying magnitude of the horizontal timing signals 35–37 indicate the black-and-white formation for the scan line 12. The minimum black-and-white level (a black level) of the horizontal signals 35–37 is equivalent to the color black, and the maximum black-and-white level of the horizontal signals 35–37 is equivalent to the color white. Thus, the minimum level of the active signal 32 is equal to the black level.

A synchronization level is the minimum voltage level of the horizontal timing signals 35–37 and cannot be seen on the screen 10. Thus, during a region 33 of the regular horizontal timing signal 35 associated with one of the vertical retrace lines 14, the horizontal timing signal 35 is equal to the synchronization level. The regular horizontal timing signal 35 also has a region 29 which contains a color burst signal 34. The color burst signal 34 is a reference signal used to extract color information from the active signal 32.

The serration 36 and equalization 37 pulse signals occur during video blanking (i.e., during times when no additional illumination of the screen 10 occurs), such as during the generation of the vertical retrace line. The serration 36 and equalization 37 pulse signals can be distinguished by the length of the regions 38 and 42, respectively, at which the signals are at the synchronization level.

SUMMARY OF THE INVENTION

In general, in one aspect, the invention provides a method for generating timing signals for use in generating a video signal. Vertical timing codes and horizontal timing codes are stored in a memory. The horizontal timing codes define regions of at least two types of horizontal timing signals of the video signal, and the vertical timing codes define the timing of the horizontal timing signals. The vertical and horizontal timing codes are stepped through to generate at least one signal indicative of the timing of the horizontal timing signals.

In general, in another aspect, the invention features a timing generator having a memory that stores vertical timing codes and horizontal timing codes. The horizontal timing codes define regions of at least two types of horizontal timing signals of the video signal, and the vertical timing codes define the timing of the horizontal timing signals. The timing generator has a sequencer that steps (e.g., reads) through the vertical and horizontal timing codes and generates at least one signal indicative of the timing of the horizontal timing signals.

In preferred embodiments, the sequencer generates signals indicative of the types of horizontal timing signals. The sequencer also generates signals indicative of the appearance of the regions (e.g., a color burst region) in the video signal. The horizontal timing codes define regions for at least three types of horizontal timing signals, which might include a regular horizontal timing signal, a serration pulse signal, or an equalization pulse signal. The vertical timing codes include a definition of a number of cycles for one of the types of horizontal timing signals (where a cycle is defined by events in the horizontal timing), and the horizontal timing codes define a duration (in timing clock cycles) for the regions of the horizontal timing signals.

Among the advantages of the invention are one or more of the following. A wide variety of timing standards (e.g., NTSC or PAL) may be generated. The circuitry to generate the timing signals is compact.

Other advantages will become apparent from the following description and from the claims.

BRIEF DESCRIPTION OF THE DRAWING

FIG. 9 is a table illustrating horizontal timing states.

FIG. 10 is a table illustrating vertical timing states.

FIG. 11 is a table illustrating exemplary values for the horizontal timing codes.

FIG. 12 is a table illustrating exemplary values for the vertical timing codes.

DESCRIPTION OF THE PREFERRED EMBODIMENTS

Figure 1:
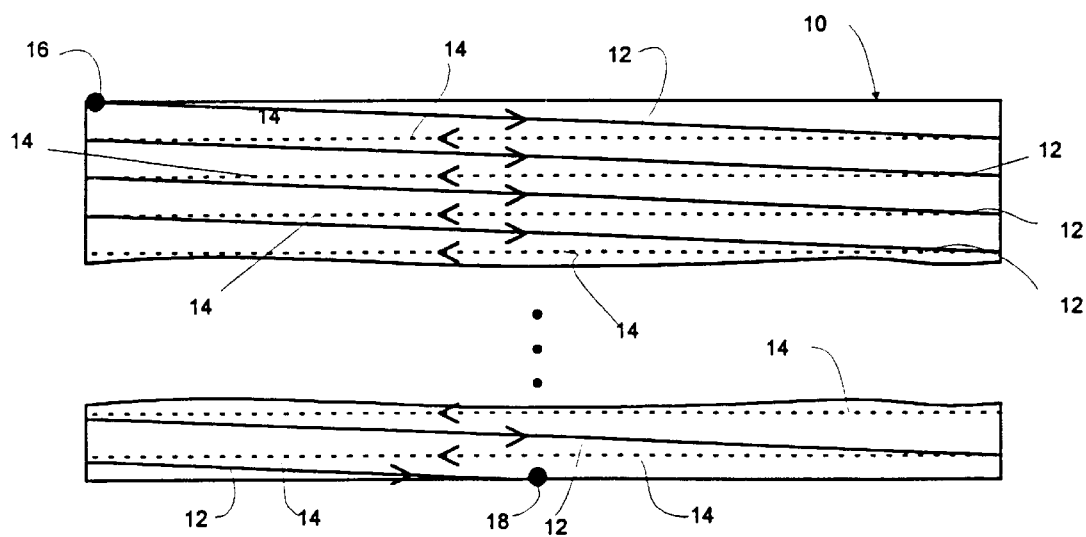
FIG. 1 is an illustration of a scan line pattern of a television screen.
Figure 2:
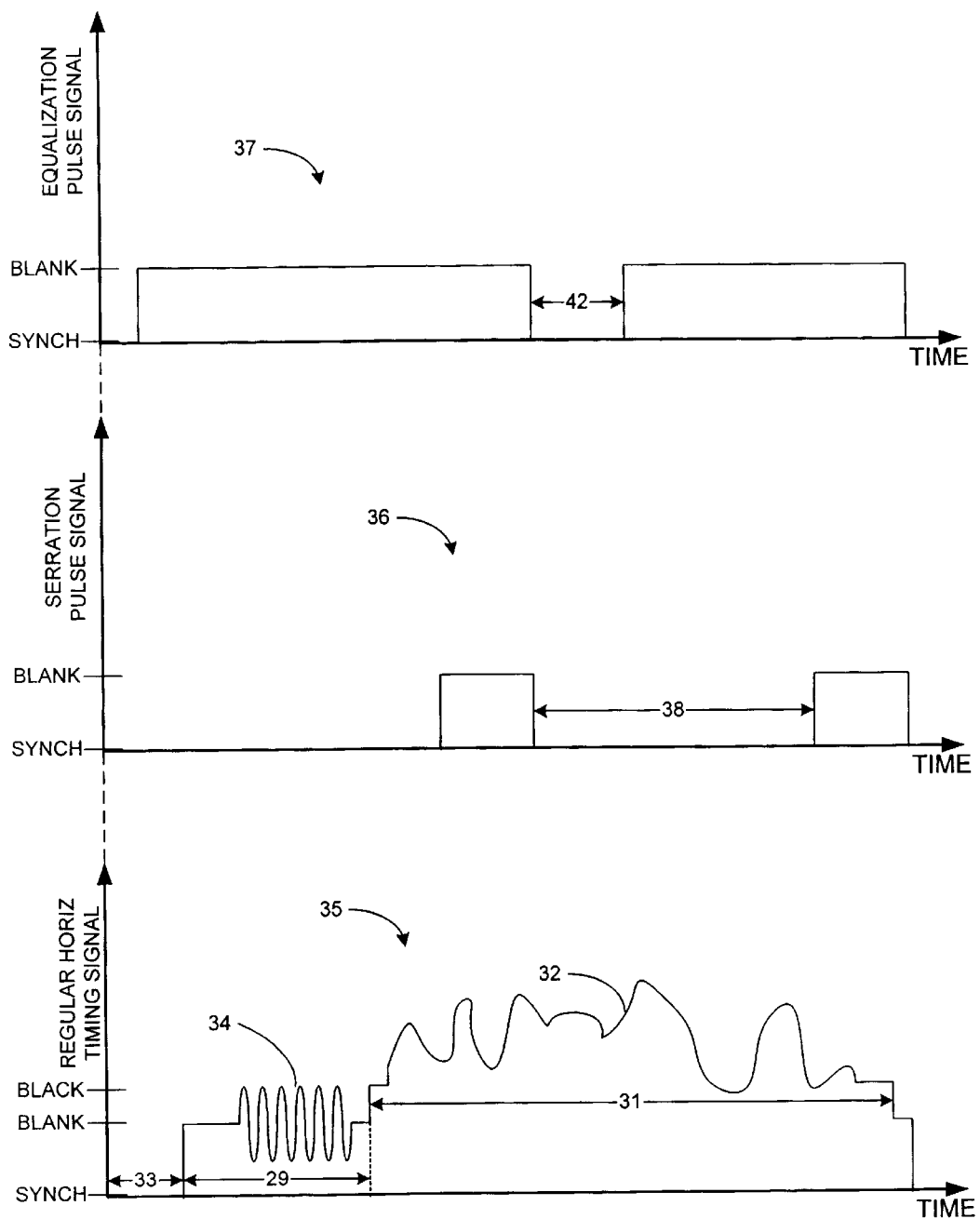
FIG. 2 is a graph illustrating video horizontal timing signals.
Figure 3:
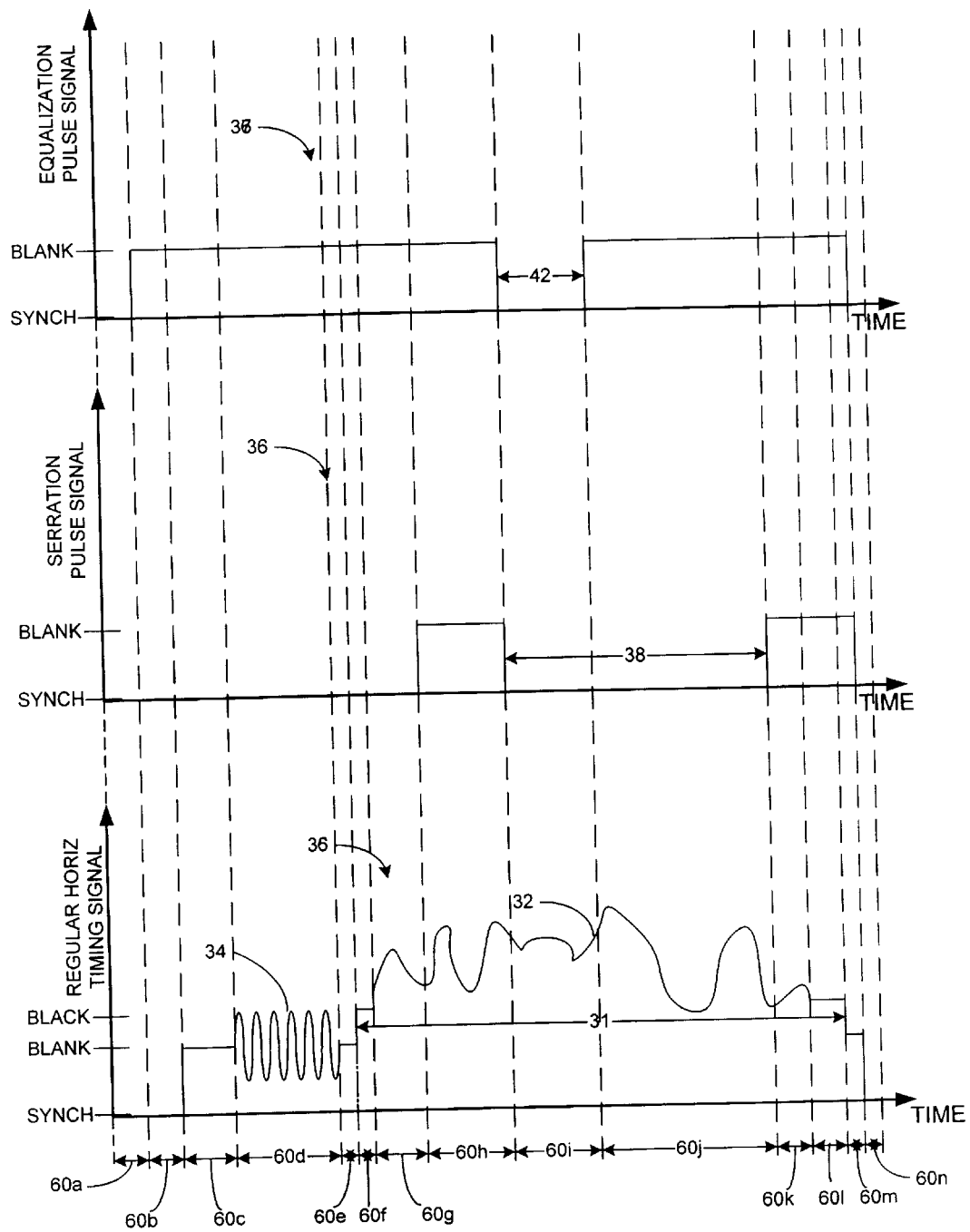
FIG. 3 is a graph illustrating video horizontal timing signals subdivided in time by states of the horizontal timing signals.
Figure 4:
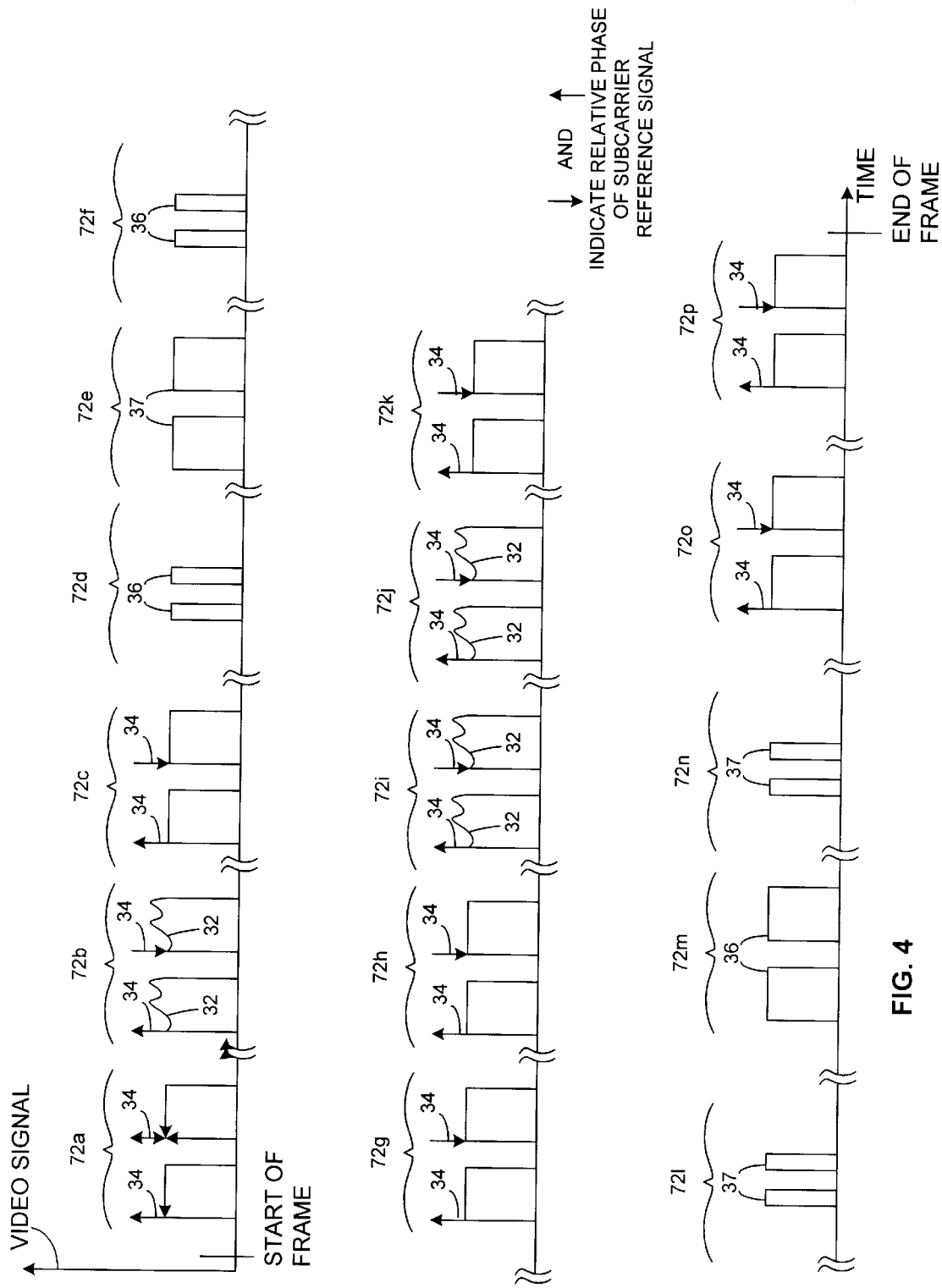
FIG. 4 is a graph illustrating a vertical timing of the horizontal timing signal subdivided in time by states of the vertical timing.

As shown in FIGS. 3 and 4, flexibility in the generation of horizontal and vertical timing for a video signal is accomplished by subdividing the video signal in time according to states of the video signal. As shown in FIG. 3, each of the three fundamental horizontal timing signals 35–37 is subdivided into fourteen regions 60*a–n* of time. For each of the timing signals 35–37, each of the regions 60*a–n* defines a time interval for a horizontal state.

The boundaries of the regions 60*a–n* are defined by the transition of any one of the timing signals 35–37 into a different horizontal state. As a result, one of the signals 35–37 may be in the same horizontal state for two or more adjacent regions 60*a–n*. For example, although the boundary of regions 60*i* and 60*j* reflects the transition of the equalization pulse signal 37 into another horizontal state, the regions 60*i* and 60*j* define a time interval during which the serration timing signal 36 remains in the same horizontal state (i.e., the serration timing signal 36 remains at the synchronization level). The regions 60*a–n* may also be subdivided to reduce the size of memory space (described below) used to define the duration of each of the regions 60*a–n*. For example, region 60*j* may be subdivided into several smaller regions, although the states of the horizontal timing signals 35–37 do not change during the region 60*j*.

Figure 21:
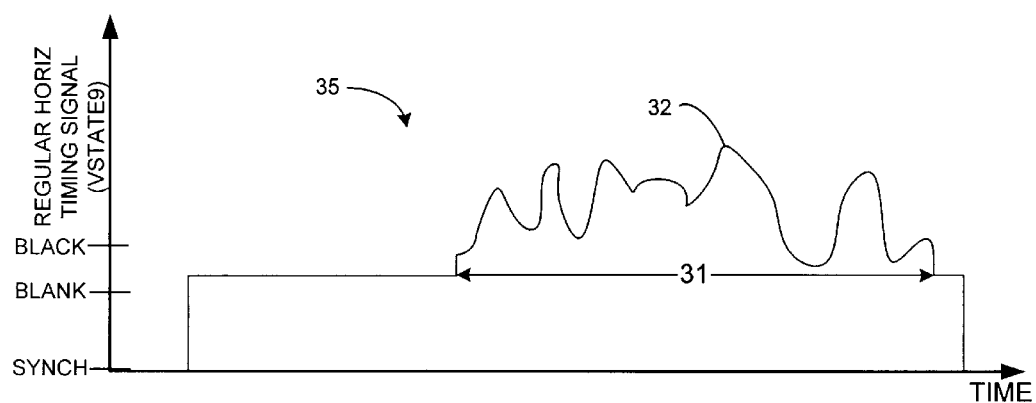

As shown in FIG. 4, the vertical timing of the video signal is also subdivided into regions 72 which describe the vertical states of the video signal. The vertical states describe the selection of the horizontal timing signals 35–37, the order in which the horizontal timing signals 35–37 appear, and the characteristics of the horizontal timing signal 35–37 selected. As an example of the characteristics, some of the regular horizontal timing signals 35 may not have the color burst signal 34 (FIG. 21).

Figure 5:
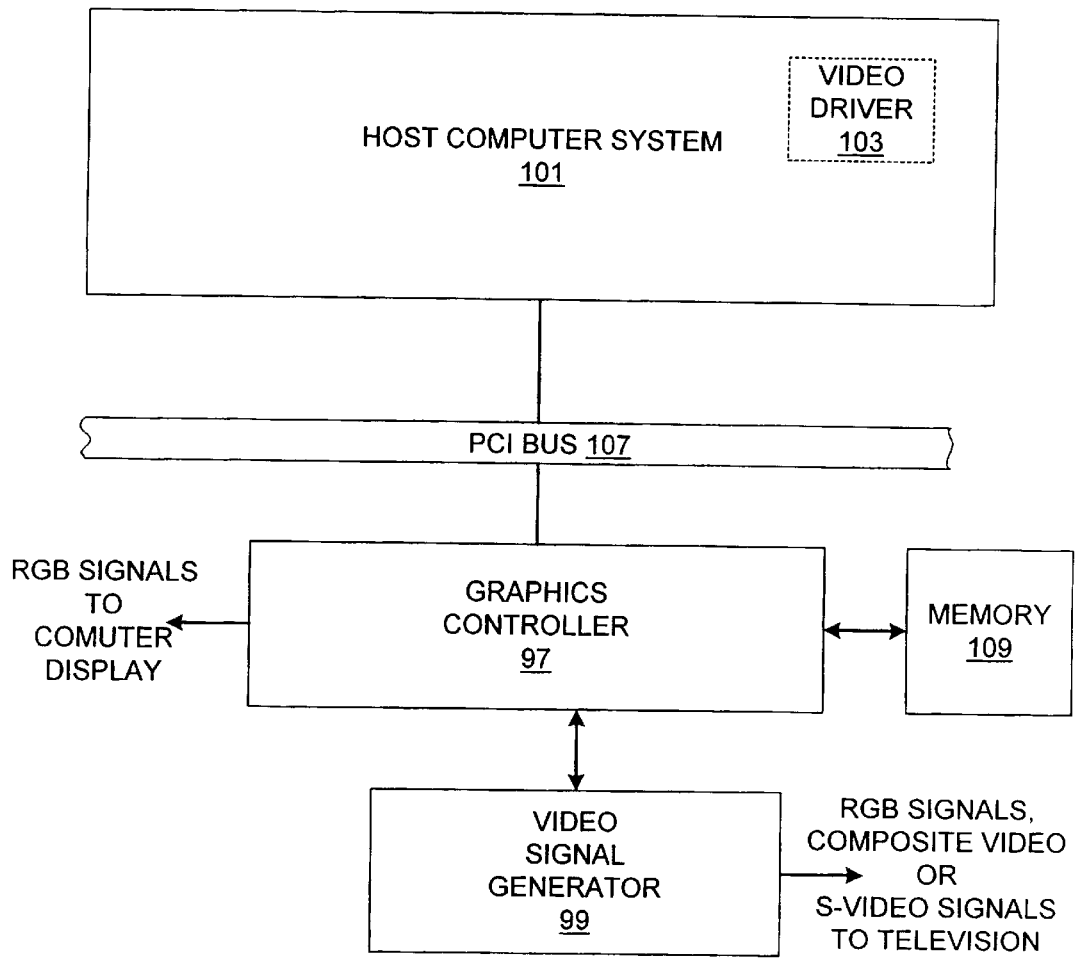
FIG. 5 is a block diagram of a computer system.

As shown in FIG. 5, in order to achieve this flexible configuration, a video signal generator 99 stores vertical timing codes 106 and horizontal timing codes 108. The timing codes 106 and 108 define, respectively, the vertical and horizontal timing by defining the states of the video signal. The timing codes 106 and 108 are developed by a video driver 103 of a host computer system 101 and sent to the video signal generator 99 via a Peripheral Component Interconnect (PCI) bus 107. A graphics controller 97 is interfaced to the PCI bus 107 and directs the timing codes 106 and 108 to the video signal generator 99. More than one type of video standard (e.g., a NTSC or PAL video standard) may be created by the video driver 103 and stored in the video signal generator 99.

The graphics controller 97 furnishes red, green, and blue (RGB) signals to a computer monitor and uses a memory 109 to temporarily store image data to be displayed on the monitor. The graphics controller 97 also furnishes twenty-four bits of RGB graphics data to the video signal generator 99. The video signal generator 99 processes the graphics data to furnish video signals for use by, for example, a television. Based on the status of a configuration bit, the video signal generator 99 furnishes either RGB signals, a composite video signal, or an S-video signal.

Figure 6:
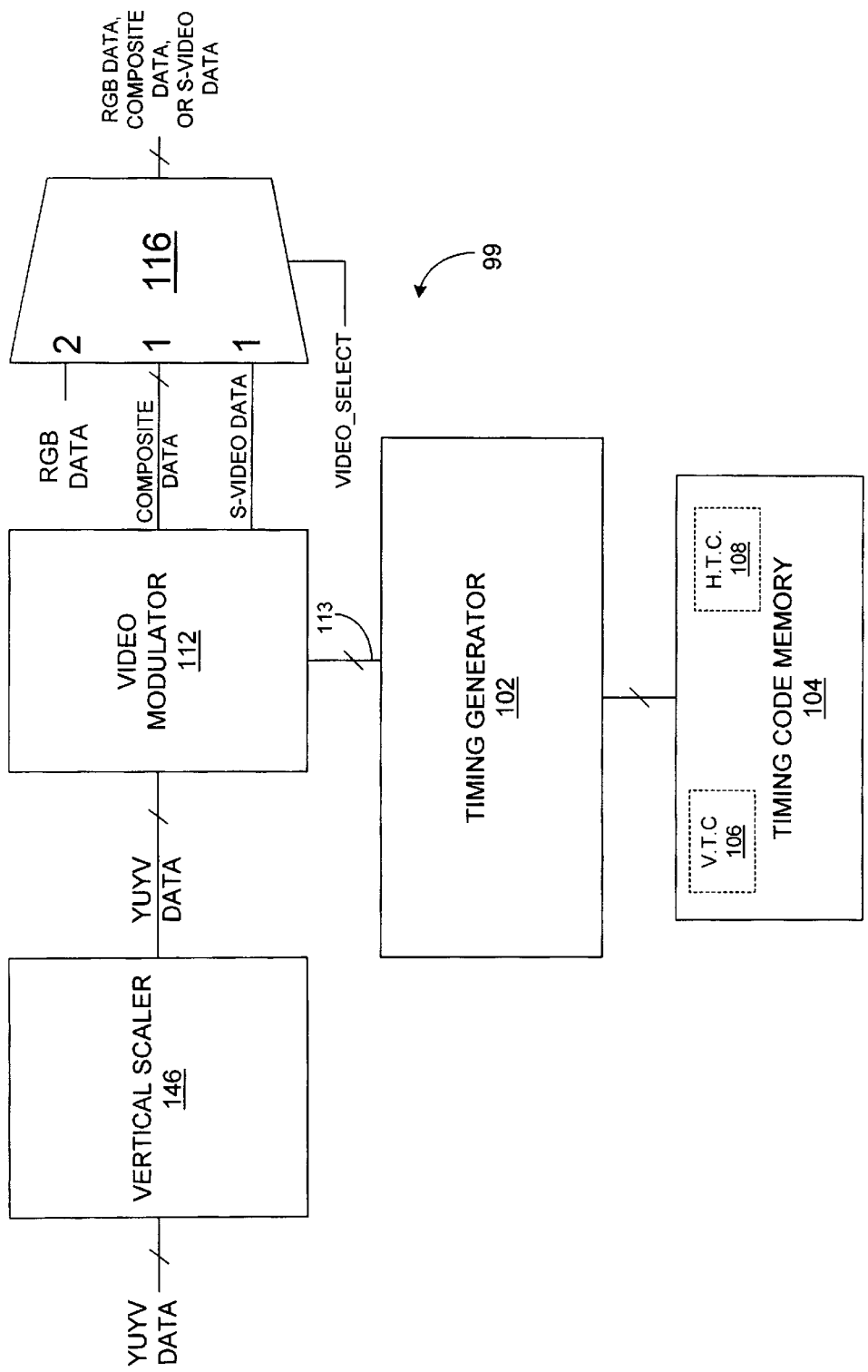
FIG. 6 is a block diagram of the video signal generator of FIG. 5.

As shown in FIG. 6, inside the video signal generator 99, the horizontal 106 and vertical 108 timing codes are stored in a timing code memory 104. A timing generator 102 steps through the vertical 106 and horizontal 108 timing codes to generate timing signals 113 used to generate the video signal.

The video signal generator 99 has a video modulator 112 which receives the timing signals 113 and retrieves YUYV video data from a vertical scaler 146. Based on the timing signals 113, the video modulator 112 takes the YUYV data from the scaler 146 and converts the data into digital data representative of the composite video signal and digital data representative of the S-Video video signal. The composite data and S-Video data is received by a multi-bit multiplexer 116 which furnishes the output of the video signal generator 99. The multiplexer 116 also receives RGB data and selectively furnishes one of its inputs as the output of the video signal generator 99 based on the value of a configuration signal (set by a configuration bit) called VIDEO_SELECT.

Figure 8:
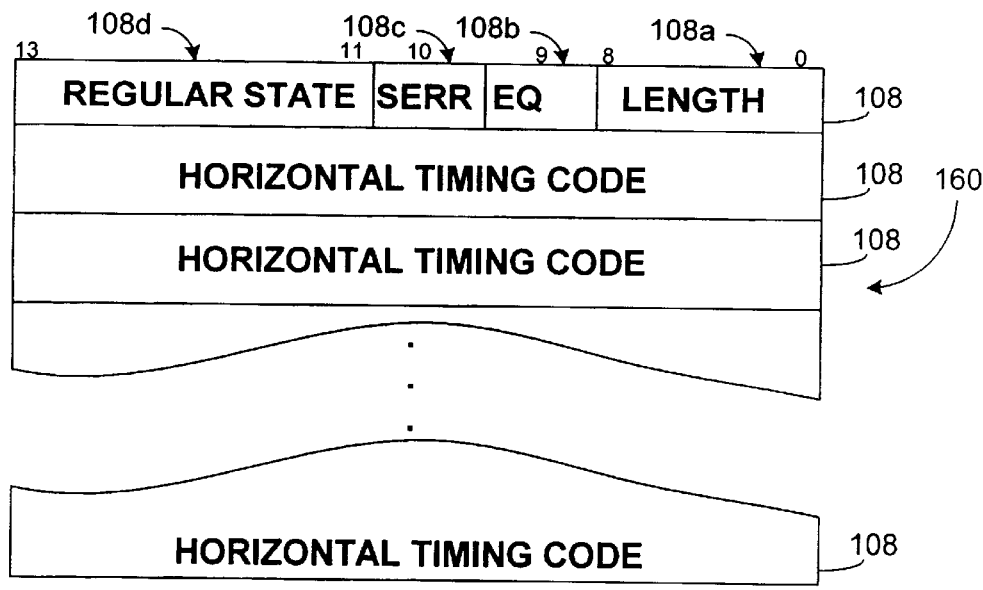
FIG. 8 is a chart illustrating horizontal timing codes.

As shown in FIG. 8, the horizontal timing codes 108 are arranged in a contiguous block 160 in the memory 104. Each horizontal timing code 108 contains information for one of the regions 60*a–n* for all three horizontal timing signals 35–37. Thus, the timing generator 102 steps through one of the horizontal timing signals 35–37 by sequentially stepping through each of the horizontal timing codes 108 in the horizontal timing code block 160. Each horizontal timing code 108 has four fields 108*a–d* which occupy fourteen bits. One field 108*a* (the nine least significant bits) contains the length of the region 60 (i.e., the number of clock cycles in one of the regions 60*a–n*) Bit nine (field 108*b*) of the horizontal timing code 108 is indicative of whether the equalization pulse signal 37 is at the synchronization level. Bit 10 (field 108*c*) is indicative of whether the serration horizontal timing signal 36 is at the synchronization level. Bits 11–13 (field 108*d*) indicate a state of the regular horizontal timing signal 35, further described below.

Figure 7:
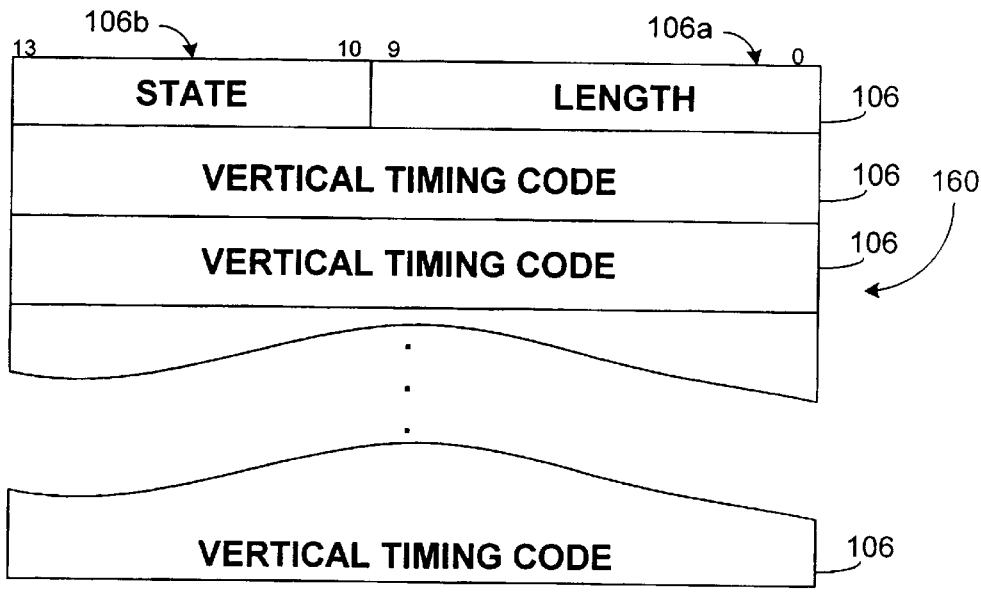
FIG. 7 is a chart illustrating vertical timing codes.

As shown in FIG. 7, like the horizontal timing codes 108, the vertical timing codes 106 are arranged in a contiguous block 162 in the memory 104. Each vertical timing code 106 has two fields 106*a–b*. The ten least significant bits of the vertical timing code 106 (field 106*a*) contains the length of the region 72 (in half scan lines 12). Bits 10–13 (field 106*b*) contains a state of the vertical timing, further described below.

Because all three types of horizontal timing signals 35–37 are included in each horizontal timing code 108, regardless of the type of horizontal timing signal 35–37, the timing generator 102 sequentially steps through all of the horizontal timing codes 108 of the block 160.

As shown in FIGS. 3 and 9, there are eight horizontal states: HSTATE0, HSTATE1, HSTATE2, HSTATE3, HSTATE4, HSTATE5, HSTATE6, and HSTATE7. In the state HSTATE0 state, the regular horizontal timing signal 35 is at a synchronization level (e.g., regions 60*a* and 60*b*). In the HSTATE1 state, the horizontal timing signal 35 is at the blank level (e.g., regions 60*c* and 60*f*). In the HSTATE2 state, the horizontal timing signal 35 is at the black level (e.g., regions 60*f* and 60*l*). In the HSTATE3 state, the horizontal timing signal 35 is in the active region 32 (e.g., regions 60*g–k*). In the HSTATE4 state, the regular horizontal timing signal 35 is in its last region 60*n*. In the region 60*n*, the regular horizontal timing signal 35 is at the synchronization level; however, the HSTATE4 state indicates the end of all horizontal timing signals 35–37, and at this point indicates that the next vertical timing code 106 needs to be processed (as described below). The HSTATE5 state indicates the presence of the color burst signal 34 (e.g., region 60d) and the regular horizontal timing signal 35 is biased at the blank level. The HSTATE6 state is a control state indicating to the timing generator 102 to maintain the previous state. The HSTATE7 state indicates both an active region 31 (e.g., regions 60h and 60i) and indicates that the next vertical timing code 106 needs to be processed (as described below).

The HSTATE4 supports a premature or delayed count for a counter (described below) used to measure the duration of a region 60. This feature is enabled by the specific vertical states (described below) and two signals called SHORT-LINE and LONGLINE, further described below. This feature is advantageous, for example, to shorten selected scan lines 12. Exemplary values for the horizontal timing codes 108 are shown in FIG. 11.

As shown in FIGS. 4 and 10, the vertical timing has eleven vertical states: VSTATE0, VSTATE1, VSTATE2, VSVSTE3, VSTATE4, VSTATE5, VSTATE6, VSTATE7, VSTATE8, VSTATE9, and VSTATE10. The remaining states, VSTATE11, VSTATE12, VSTATE13, VSTATE14, and VSTATE15 are reserved. The VSTATE0 state indicates the normal end of the vertical timing sequence of the frame, indicates that the timing generator 102 should move a pointer (represented by VVALUE_ADR[9:0]) to the beginning (represented by MAX_UV_ADR[9:0]) of the vertical timing codes 106 in the memory 104, and directs a vertical state machine (FIG. 13) of the timing generator 102 to maintain the previous vertical state. The VSTATE1 state indicates to the vertical that a shorter than normal scan line 12 will occur in the current regular horizontal timing signal 35, and the VSTATE1 state further directs the vertical state machine 182 to maintain the previous vertical state.

The VSTATE2 state indicates to the vertical state machine 182 that the current regular horizontal timing signal 35 represents a longer than average scan line 12, and the VSTATE2 state further directs the vertical state machine 182 to maintain the previous vertical state. The VSTATE3 state indicates to the vertical state machine 182 that the current horizontal timing signal is a serration pulse signal 36, and the VSTATE4 state indicates to the vertical state machine 182 that the current horizontal timing signal is the equalization pulse signal 37.

Figure 18:
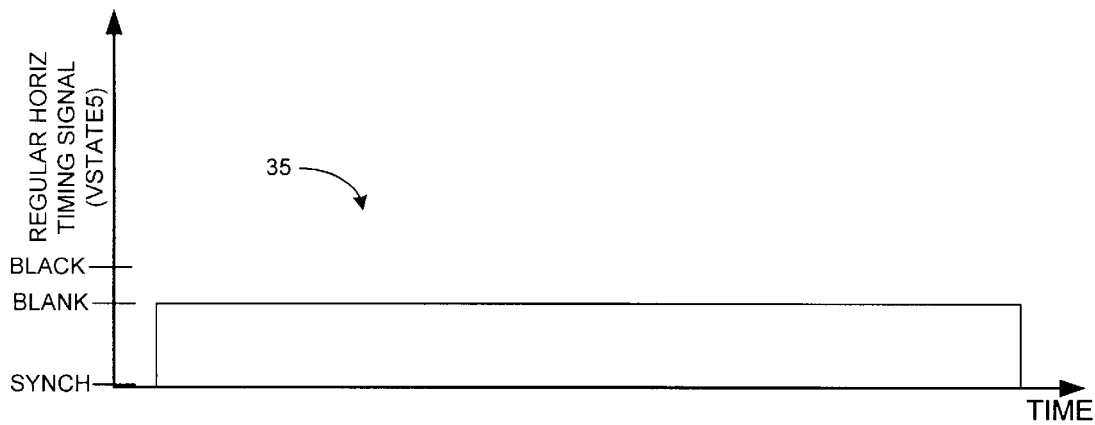
FIGS. 18–21 are waveforms illustrating horizontal timing signals for different vertical states.
Figure 19:
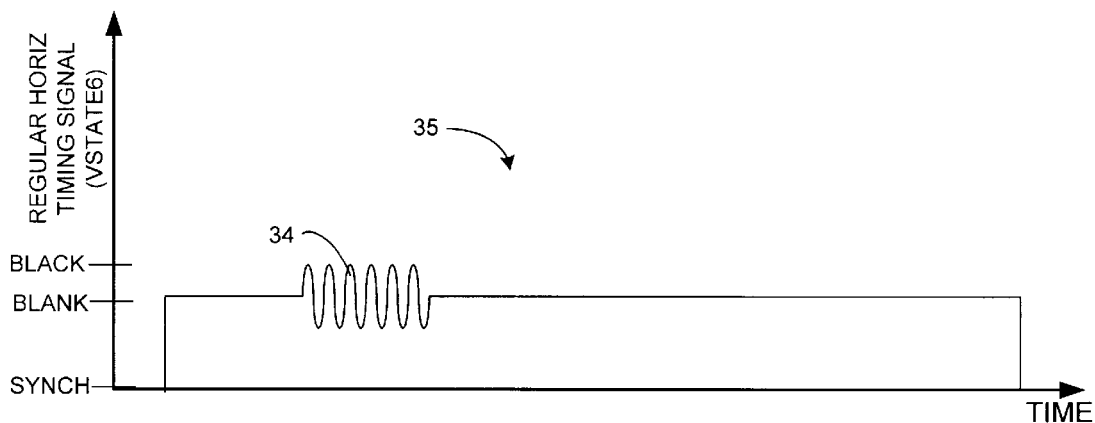

As shown in FIG. 18, the VSTATE5 state indicates a regular horizontal timing signal 35 without the active signal 32, with the blank level, without the color burst, and without the black level. As shown in FIG. 19, the VSTATE6 state indicates a regular horizontal timing signal 35 with the blank level, without the black level and active regions, and with the color burst 34 (e.g., regions 72g and 72o).

Figure 20:
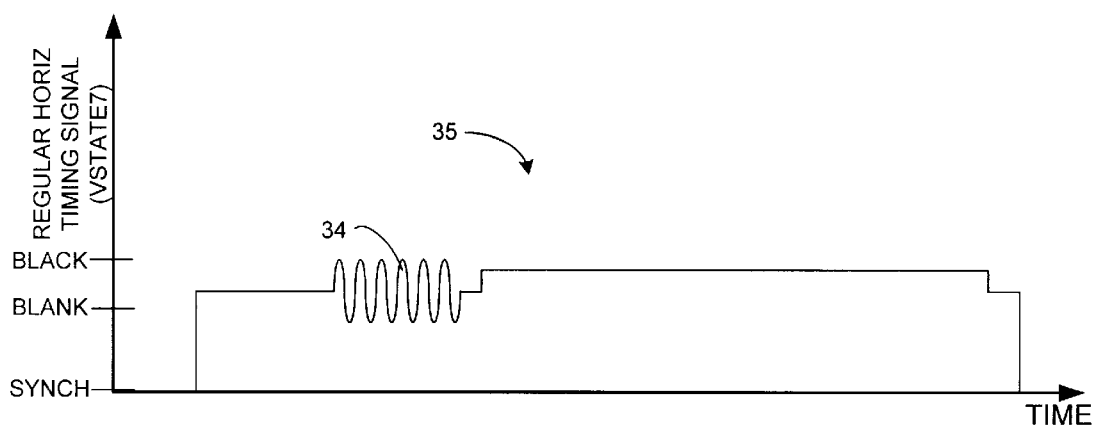

As shown in FIG. 20, the VSTATE7 state indicates a regular horizontal timing signal 35 with setup, color burst, and without any active region (e.g., regions 72a, 72c, 72h, and 72p). The VSTATE8 state indicates a regular horizontal timing signal 35 with all levels and regions (e.g., regions 72b and 72i). As shown in FIG. 21, the VSTATE9 state indicates a regular horizontal timing signal 35 without the color burst signal 34 (i.e., in accordance with the PAL video standard). The VSTATE10 state indicates to the timing generator 102 to maintain the previous vertical state and may be used to generate an interrupt. The states VSTATE11–15 are reserved. Exemplary values for the vertical timing codes 106 are shown in FIG. 11.

Figure 13A:
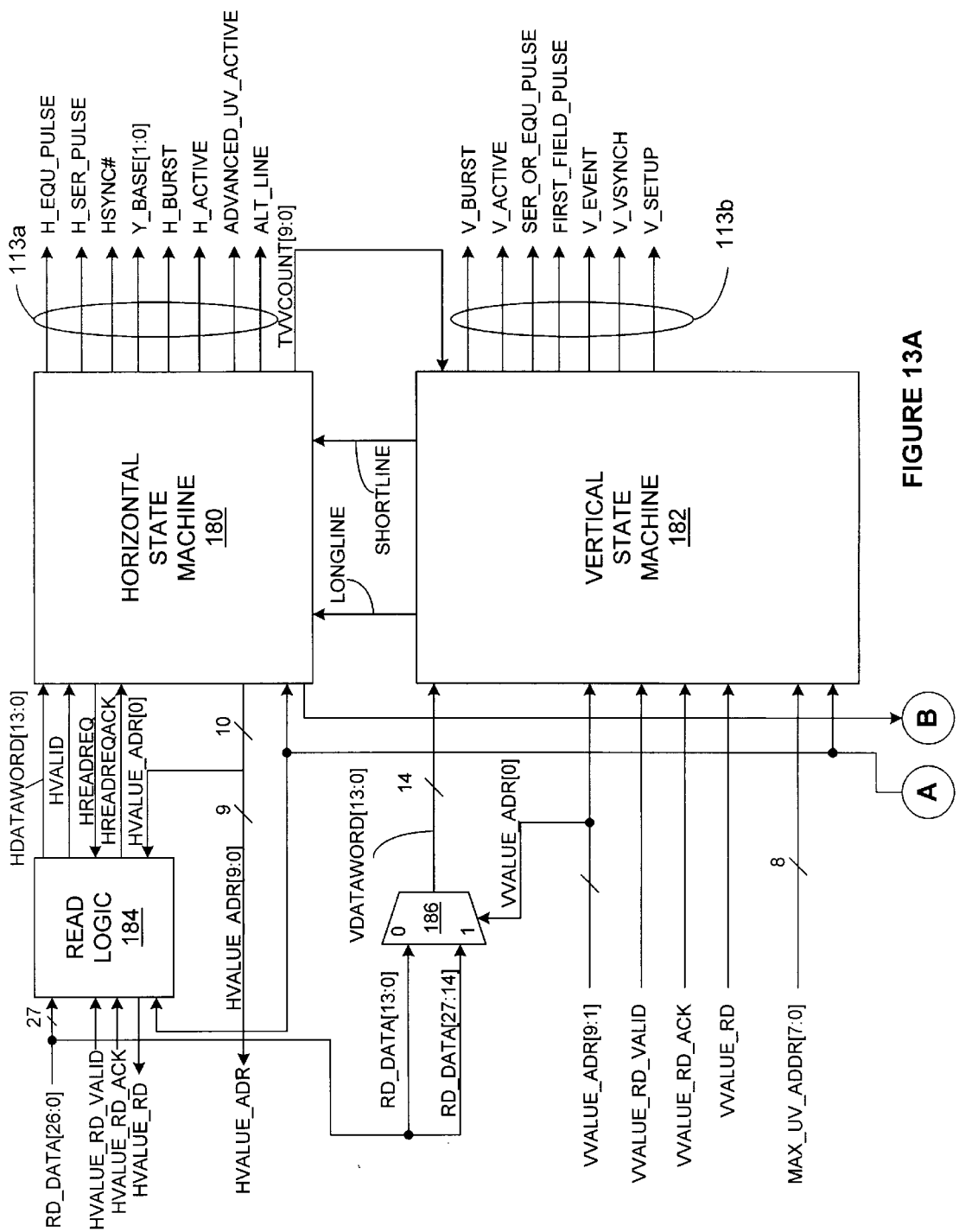
FIG. 13 is a block diagram of the timing generator of FIG. 6.
Figure 13B:
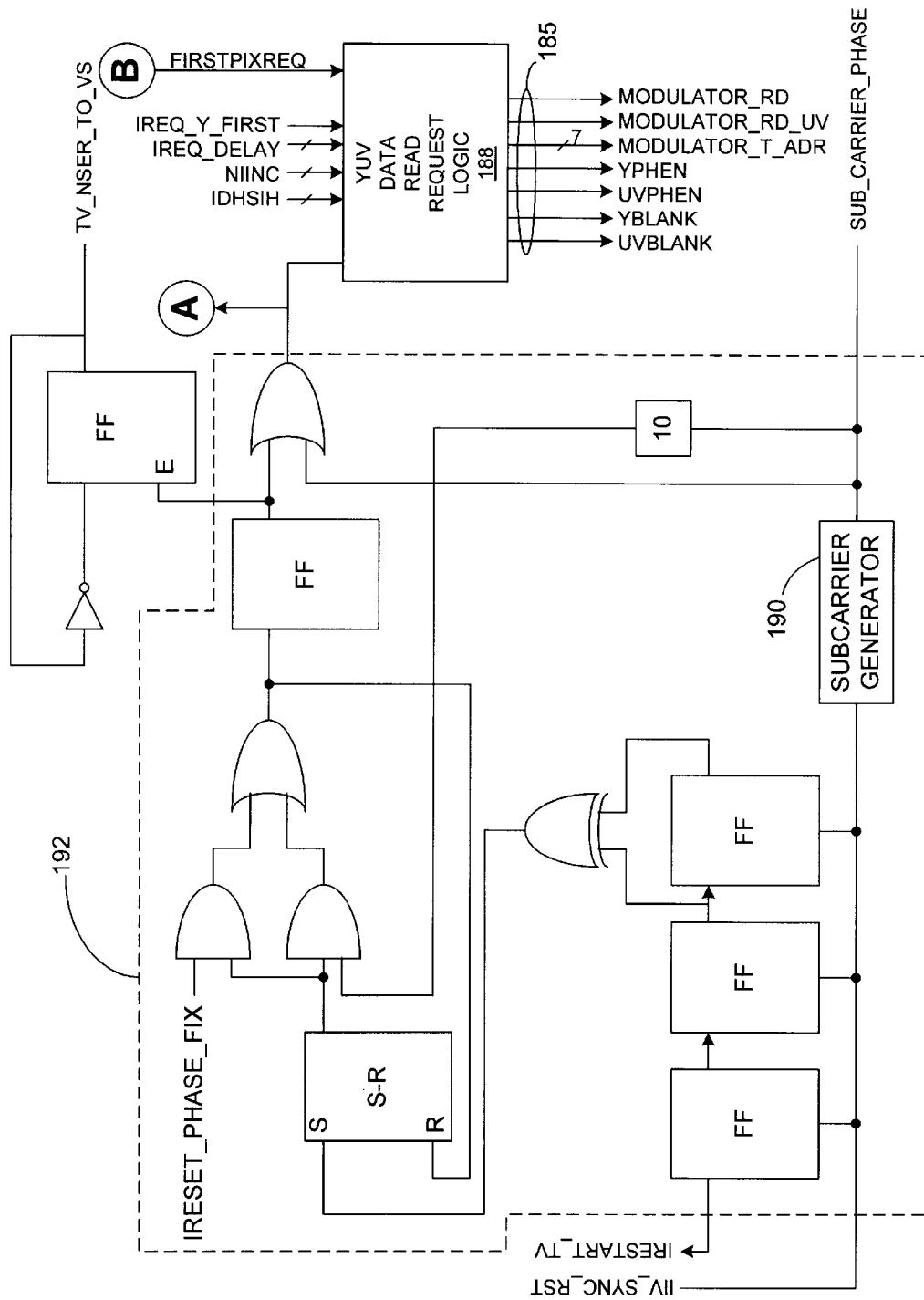

As shown in FIG. 13, the timing generator 102 includes a horizontal state machine 180 which receives the horizontal timing codes 108 from the memory 104 and furnishes the timing signals 113a that direct to the horizontal timing of the video signals furnished by the vertical scaler 146. The horizontal state machine 180 keeps track of the horizontal timing codes 108 via a counter represented by TVHCOUNT [9:0]. The horizontal state machine 180 also has a vertical counter (represented by TVVCOUNT[9:0]) which a vertical state machine 182 uses to track the vertical timing of the video signals. The vertical state machine 182 furnishes the timing signals 113b corresponding to the vertical timing and retrieves the vertical timing codes 106 from the memory 104.

For the generation of one of the horizontal timing signals 35–37, the horizontal state machine 180 receives one horizontal timing code 108, processes the horizontal timing code 108 to create the timing for one region 60, and then repeats this process by sequentially receiving and processing the other horizontal timing codes 108 until the timing for this one horizontal timing signal 35–37 has been completed. The horizontal state machine 180 then retrieves the first horizontal timing code 108 of the block 160 and repeats the above-described process. To aid the horizontal state machine 180 in its reading of the data from the memory 104, the timing generator 102 has read logic 184 which concurrently retrieves two horizontal timing codes 108 (i.e., twenty-eight bits) from the memory 104.

The timing signals 113a are indicative of the current states of all three horizontal timing signals 35–37. The video modulator 112 determines from the signals 113b furnished by the vertical state machine 182 which one of the horizontal timing signals 35–37 needs to be generated. Based on this determination, the video modulator 112 selects the appropriate timing signals 113a furnished by the horizontal state machine 180.

The signals 113a furnished by the horizontal state machine 180 include a signal called H_EQU_PULSE which is representative of the equalization pulse signal 37. The horizontal state machine 180 also furnishes a signal called H_SER_PULSE which is representative of the serration pulse signal 36. To indicate when the regular horizontal timing signal 35 is at the synchronization level, the horizontal state machine 180 furnishes a signal called HSYNC# (wherein the suffix "#" indicates negative logic). The horizontal state machine 180 also generates two signals represented by Y_BASE[1:0] which indicates the level (i.e., the synchronization, blank, or black level) of the regular horizontal timing signal 35. To indicate when the color burst subcarrier signal 34 should be generated, the horizontal state machine 180 generates a signal called H_BURST which is active when asserted. The horizontal state machine 180 also generates a signal called H_ACTIVE which indicates, by its assertion, when the active signal 32 of the horizontal timing signal 35 should be generated. A signal called ADVANCED_UV_ACTIVE indicates, by its assertion, an upcoming regular horizontal timing signal 35 with all of the regions and levels. For the PAL video standard, the horizontal state machine 180 provides a signal called ALT_LINE which indicates the phase of the color burst signal 34.

The signals 113b furnished by the vertical state machine 182 includes a signal called V_BURST which indicates, by its assertion, the occurrence of the color burst signal 34 (for the regular horizontal timing signal 35). The vertical state machine 182 also provides a signal called V_ACTIVE which indicates, by its assertion, when the regular horizontal timing signal 35 should have all of its levels and regions. A signal called SER_OR_EQU_PULSE is asserted by the vertical state machine 180 when either the serration pulse signal 36 or the equalization pulse signal 37 is selected. To distinguish between the serration 36 and equalization 37 pulse signals, the vertical state machine 182 asserts a signal called V_VSYNC#.

The signals 113b also include a signal called FIRST_FIELD_PULSE which indicates, by its assertion, the beginning of a new frame. A signal called V_EVENT indicates, by its assertion, an interrupt in conjunction with the VSTATE10 state. To indicate the occurrence of the setup (e.g., region 60f) for the regular horizontal timing signal 35, the vertical state machine furnishes a signal called V_SETUP. The vertical state machine 182 also generates a signal called SHORTLINEP signal which indicates, by its assertion, whether the current regular horizontal timing signal 35 will terminate prematurely by one clock cycle. A signal called LONGLINE also indicates whether the current regular horizontal timing signal 35 has a longer (by one clock cycle) than normal duration.

As shown in FIG. 13, for purposes of requesting the horizontal timing codes 108, the horizontal state machine 180 asserts a request signal called HREADREQ. When a horizontal timing code 108 is available, the read logic 184 grants this request by asserting a signal called HREADREQACK at which time the horizontal state machine 180 puts an address HVALUE_ADR[9:0] on the bus coupled to the memory 104. The read logic 184 then furnishes the horizontal timing code 108 to the horizontal state machine 180 via a data bus HDATAWORD[13:0] and indicates the availability of the horizontal timing code 108 on this bus by asserting a signal called HVALID. The least significant address line HVALUE_ADR[0] is received by the read logic 184 and used by the read logic 184 to determine whether the logic 184 has the horizontal timing code 108 requested or needs to retrieve the code 108 from the memory 104.

The read logic 184 performs the actual transactions with the arbiter and memory 104 to obtain two horizontal timing codes 108. The read logic 184 requests the use of the bus coupled to the memory 104 through a read request signal called HVALUE_RD which is asserted to indicate a request to access this bus. When the arbiter grants the request, the arbiter asserts a signal called HVALUE_RD_ACK. Based on the address put on the bus HVALUE_ADR[9:1], the horizontal timing codes 108 (two) are then placed on a data bus RD_DATA[27:0], and the availability of the horizontal timing codes 108 on the bus are represented by the assertion of a signal called HVALUE_RD_VALID.

For purposes of reading the vertical timing codes 106 from the memory 104, the vertical state machine 182 interacts directly with the memory 104. The vertical state machine 182 asserts a signal called VALUE_RD to request access to the bus coupled to the memory 104. When an arbiter (not shown) for the memory 104 grants this request, the arbiter asserts a signal called VVALUE_RD_ACK. The vertical state machine 182 then places an address (represented by VVALUE_ADR[9:1]) on the bus coupled to the memory 104. When the data (i.e., the vertical timing code 106) is available on the bus RD_DATA[27:0], the arbiter asserts a signal called VVALUE_RD_VALID. Because the data on the bus RD_DATA[27:0] consists of two vertical timing codes 106, the timing code 106 desired is decoded by a multi-bit multiplexer 186 which divides the bus RD_DATA[27:0] into two sets of data lines. Based on the line VVALUE_ADR[0], the multiplexer 186 furnishes the requested vertical timing code 106 to the vertical state machine 182 via a bus called VDATAWORD[13:0].

Besides the horizontal 180 and vertical 182 state machines, the timing generator 102 has UV data read request logic 188 which performs the function of requesting YUV data from the memory 104 (for use by the video modulator 112). The UV data read request logic 188 receives a signal from the horizontal state machine 180 called FIRSTPIXREQ. When the FIRSTPIXREQ signal is asserted, this indicates the beginning of a new video frame to the UV data read request logic 188.

The timing generator 102 also has circuitry 192 to generate reset and restart signals for the video controller 100 and has a subcarrier generator circuit 190 which generates a signal called SUB_CARRIER_PHASE that indicates the phase of the color burst signal 34.

Figure 14:
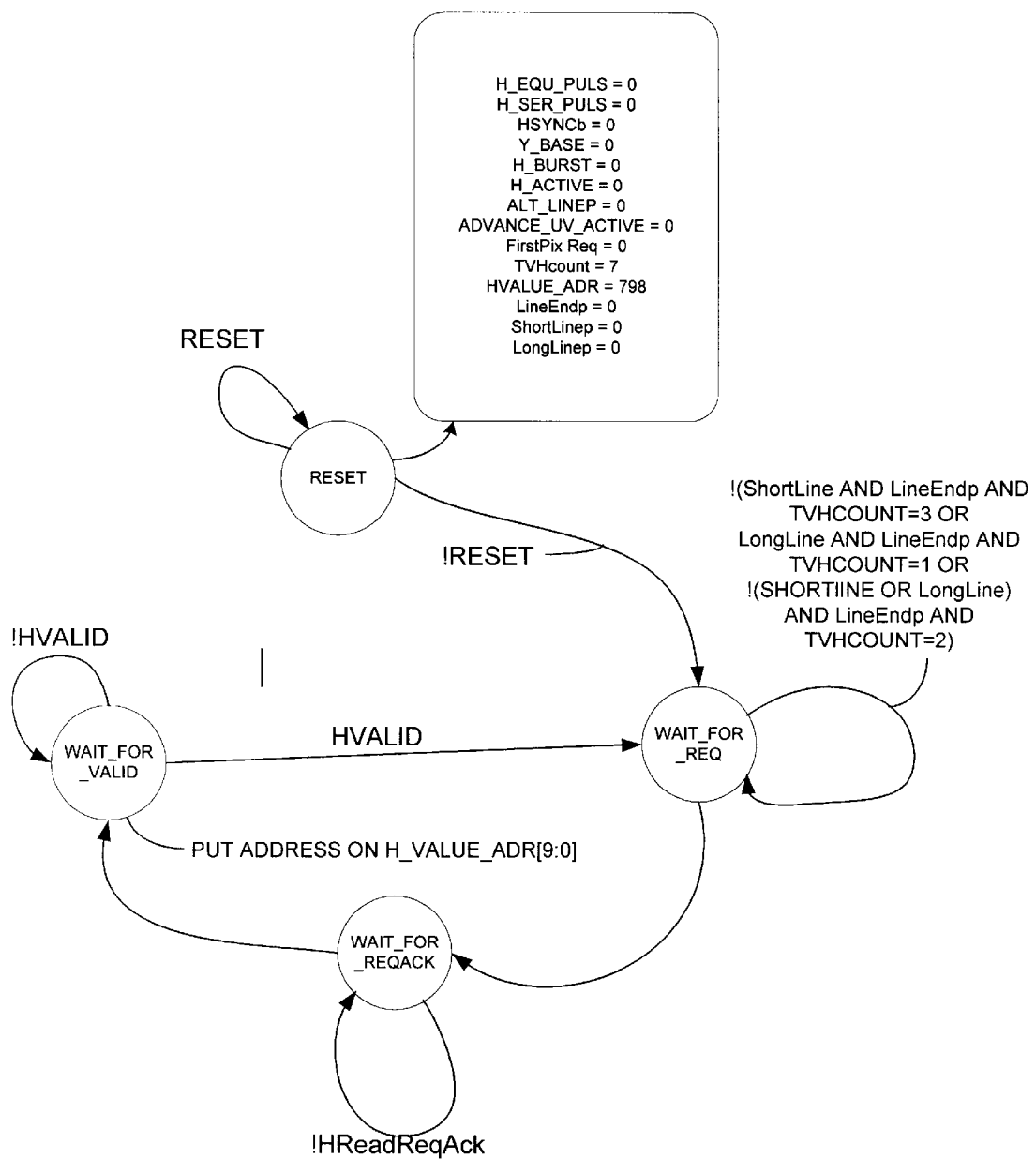
FIG. 14 is a state diagram illustrating operation of the horizontal state machine of the timing generator.

As shown in FIG. 14, during reset of the video signal generator 99, the horizontal state machine 180 is placed in a state called RESET. In the RESET state, the horizontal state machine 180 deasserts the signals 113a and sets the horizontal counter (represented by TVHCOUNT[9:0]) equal to "7." After reset, the horizontal state machine 180 transitions to a state called WAIT_FOR_REQ. In the WAIT_FOR_REQ state, the state machine 180 processes one horizontal timing code 108.

The horizontal state machine 180 then transitions to a state called WAIT_FOR_REQACK to request the next horizontal timing code 108. This occurs when either the end of a shorter than normal scan line 12 is reached and TVHCOUNT[9:0] is equal to "3"; the end of a longer than normal scan line 12 is reached and TVHCOUNT[9:0] is equal to "1"; or the end of a normal scan line has been reached and TVHCOUNT[9:0] is equal to "2."

Upon transitioning, the horizontal state machine 180 asserts the HREADREQ signal. The horizontal state machine 180 remains in the WAIT_FOR_REQACK state until a read acknowledge signal called HREADREQACK is asserted. Upon this occurrence, the horizontal state machine 180 transitions to a state called WAIT_FOR_VALID and clears the HREADREQ signal. The state machine 182 remains in this state until the HVALID signal is asserted, indicating that a valid horizontal timing code is present on the bus HDATAWORD[13:0 ]. Once this occurs, the horizontal state machine 180 transitions back to the WAIT_FOR_REQ state.

Figure 15A:
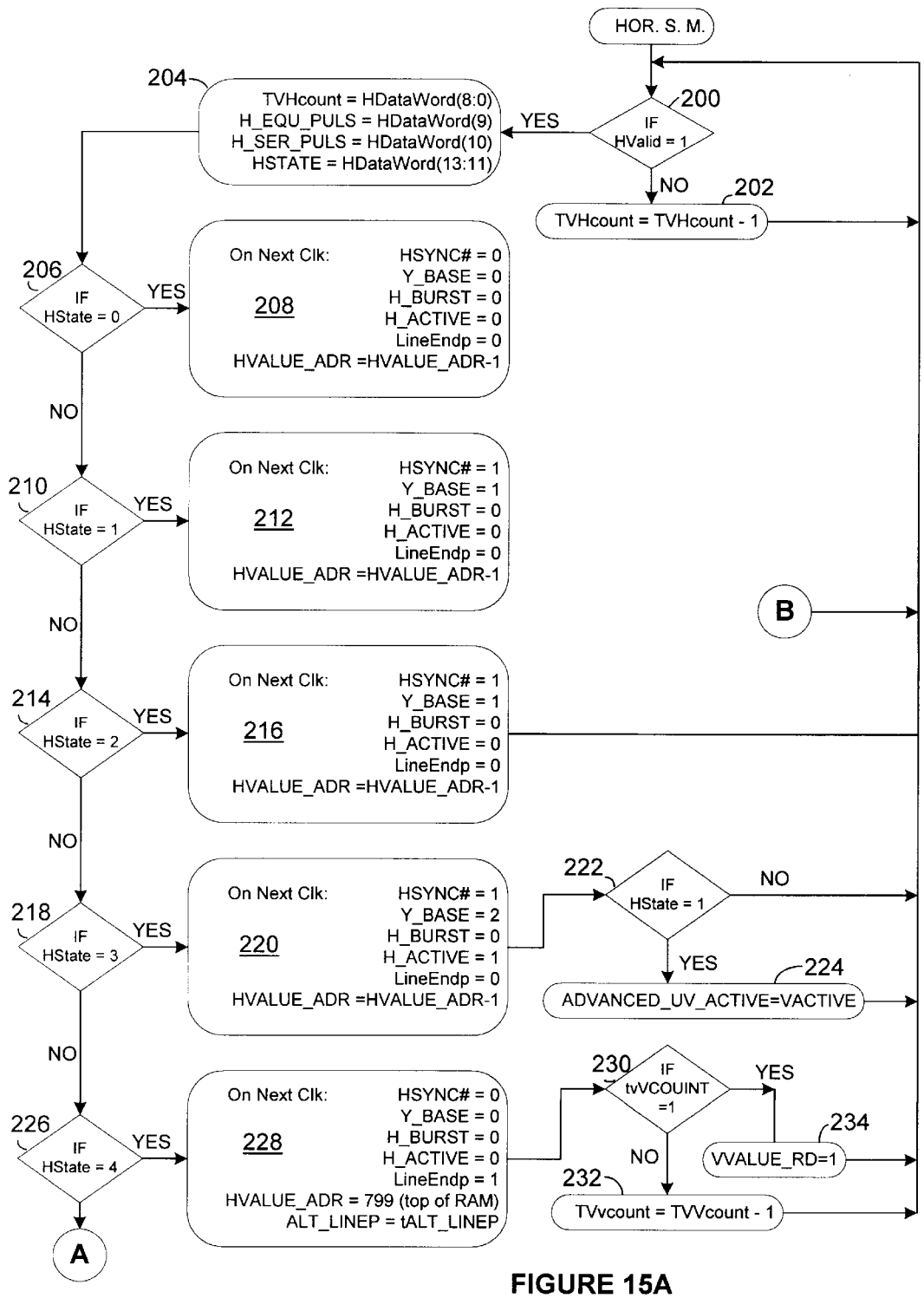
FIGS. 15A and 15B are a flow diagram illustrating operation of the horizontal state machine of the timing generator.
Figure 15B:
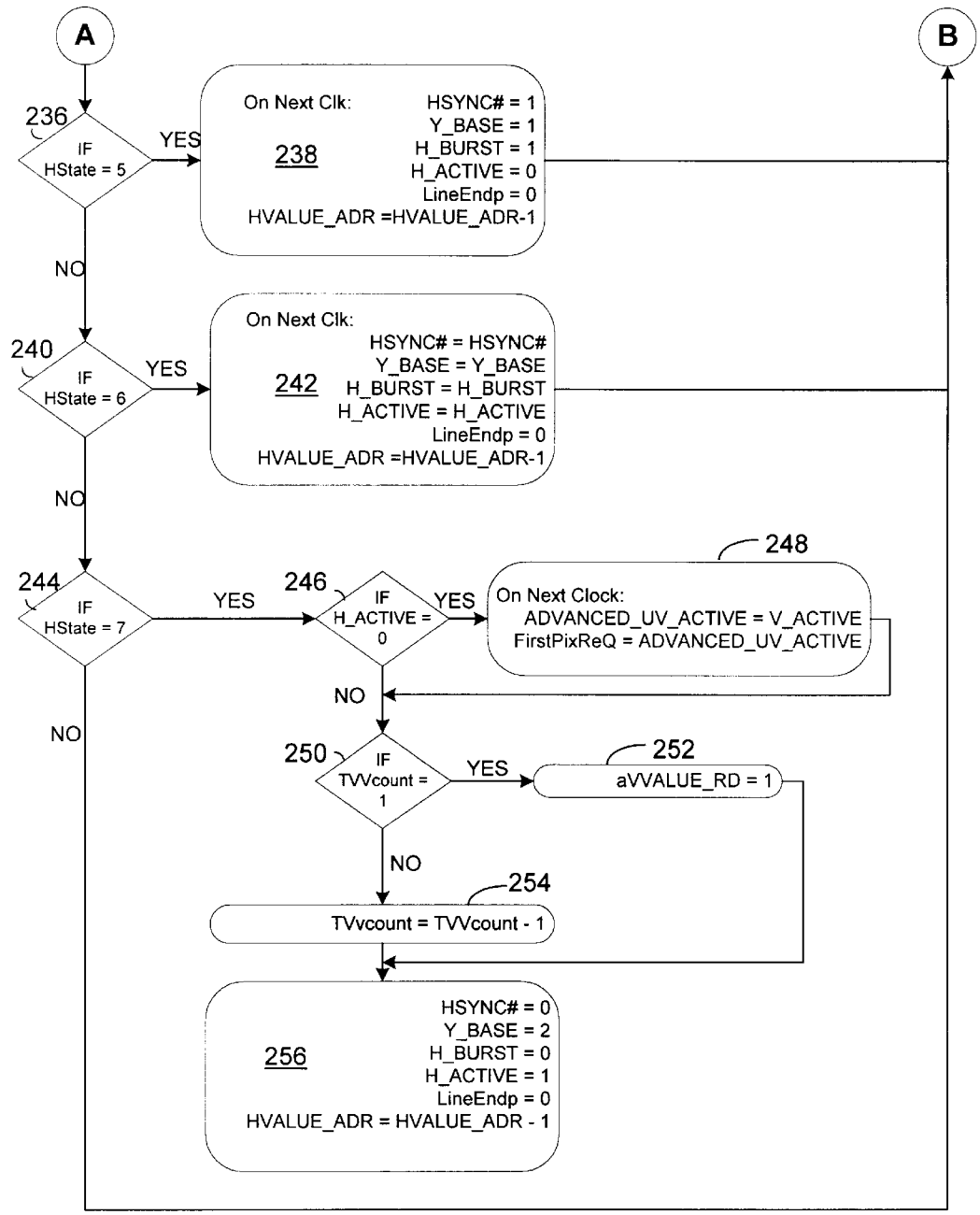

As shown in FIGS. 15A–15B, in the WAIT_FOR_REQ state the horizontal state machine 180 undergoes the following logical operations to generate the signals 113a. The horizontal state machine 180 first determines 200 whether the HVALID signal is asserted (i.e., whether another horizontal timing code 108 is present on the bus HDATAWORD [13:0].) If not, then the horizontal state machine 180 decrements the horizontal counter and returns to step 200. If so, then the horizontal state machine 180 receives the next horizontal timing code 108 from the data bus HDATAWORD[13:0] and parses the fields 108a–d of the horizontal timing code 108. If the horizontal state machine 180 determines 206 that the horizontal state is HSTATE0, then horizontal state machine 180 on the next clock cycle, asserts 208 the HSYNC# signal and sets 208 the Y_BASE [1:0] signals equal to "0" to indicate the synchronization level. The horizontal state machine 180 also, on the next clock cycle, deasserts 208 the H_BURST signal, the H_ACTIVE signal, and the LINEEND signal; and the horizontal state machine 180 decrements 208 the address represented by HVALUE_ADR[9:0].

If the horizontal state machine 180 determines 210 that the horizontal state is equal to the HSTATE1, then on the next clock cycle, the horizontal state machine 180 deasserts the HSYNC# signal; sets the Y_BASE[1:0] signal equal to "1"; deasserts the H_BURST signal, the H_ACTIVE signal, and the LINEEND signal; and decrements the address represented by HVALUE_ADR[9:0].

If the horizontal state machine 180 determines 214 that the horizontal state is equal to HSTATE2 (i.e., a black level only), then the horizontal state machine 180, on the next clock cycle, deasserts 216 the HSYNC# signal; sets 216 the Y_BASE[1:0] signals equal to "2"; deasserts the H_BURST signal, the H_ACTIVE signal, and the LINEEND signal; and decrements 216 the address represented by HVALUE_ADR[9:0].

If the horizontal state machine 180 determines 218 that the horizontal state is equal to HSTATE3, then the horizontal state machine 180, on the next clock cycle, deasserts 220, the HSYNC# signal; sets 220 the Y_BASE[1:0] signals equals "2"; deasserts 220 the H_BURST signal and the LINEEND signal; asserts 220 the H_ACTIVE signal; and decrements 220 the address represented by HVALUE_ADR [9:0]. The horizontal state machine 180 then determines 222 if the H_ACTIVE signal is asserted during the current clock cycle (i.e., thereby indicating the regular horizontal timing signal 35). If so, the horizontal state machine 180 sets 224 the signal ADVANCED_UV_ACTIVE equal to the logical level of the V_ACTIVE signal.

If horizontal state machine 180 determines 226 that the state is HSTATE4 (i.e, the last region of the regular horizontal timing signal), then the horizontal state machine 180, on the next clock cycle, asserts 228 the HSYNC# signal and the LINEEND signal; deasserts 228 the H_BURST signal and the H_ACTIVE signal; sets 228 the Y_BASE[1:0] signals equal to "0"; toggles 228 the ALT_LINE signal; and sets 328 the value represented by HVALUE_ADR equal to a pre-determined address. If the horizontal state machine 180 then determines 230 that the vertical counter is equal to "1," the horizontal state machine 180 asserts the signal VVALUE_RD to begin the process of retrieving another vertical timing code 106 from the memory 104. Otherwise, the horizontal state machine 180 decrements 232 the vertical counter.

If the horizontal state machine 180 determines 236 that the horizontal state is HSTATE5 (i.e., the color burst region 33), then on the next clock, the horizontal state machine deasserts 238 the HSYNC# signal, the H_ACTIVE signal, and the LINEEND signal; sets 238 the Y_BASE[1:0] signal equal to "1"; and decrements 238 the address represented by HVALUE_ADR[9:0].

If the horizontal state machine 160 determines 240 that the state is HSTATE6, then on the next clock cycle, the horizontal state machine 180 sets 242 the signals HSYNC#, Y_BASE[1:0], H_BURST, and H_ACTIVE equal to their current values; deasserts 242 the signal LINEEND; and decrements 242 the address represented by HVALUE_ADR [9:0].

If the horizontal state machine 180 determines 244 that the horizontal state is HSTATE7, then the horizontal state machine 180 determines 246 if the signal H_ACTIVE is deasserted. If so, then on the next clock cycle, the horizontal state machine 180 sets 248 the advanced UV_ACTIVE signal equal to the logical level of V_ACTIVE signal and sets 248 the FIRSTPIXREQ signal equal to the current value of the ADVANCED_UV_ACTIVE signal. The horizontal state machine 180 then determines 250 whether the vertical counter is equal to "1," and if so, the horizontal state machine 180 asserts 252 the VVALUE_RD signal.

Otherwise, the horizontal state machine 180 decrements 254 the vertical counter. The horizontal state machine 180 then deasserts 256 the HSYNC# signal, the H_BURST signal, and the LINEEND signal; asserts 256 the H_ACTIVE signal; sets 256 the Y_BASE[1:0] signals equal to "2"; and decrements 256 the address represented by HVALUE_ADR [9:0].

Figure 16:
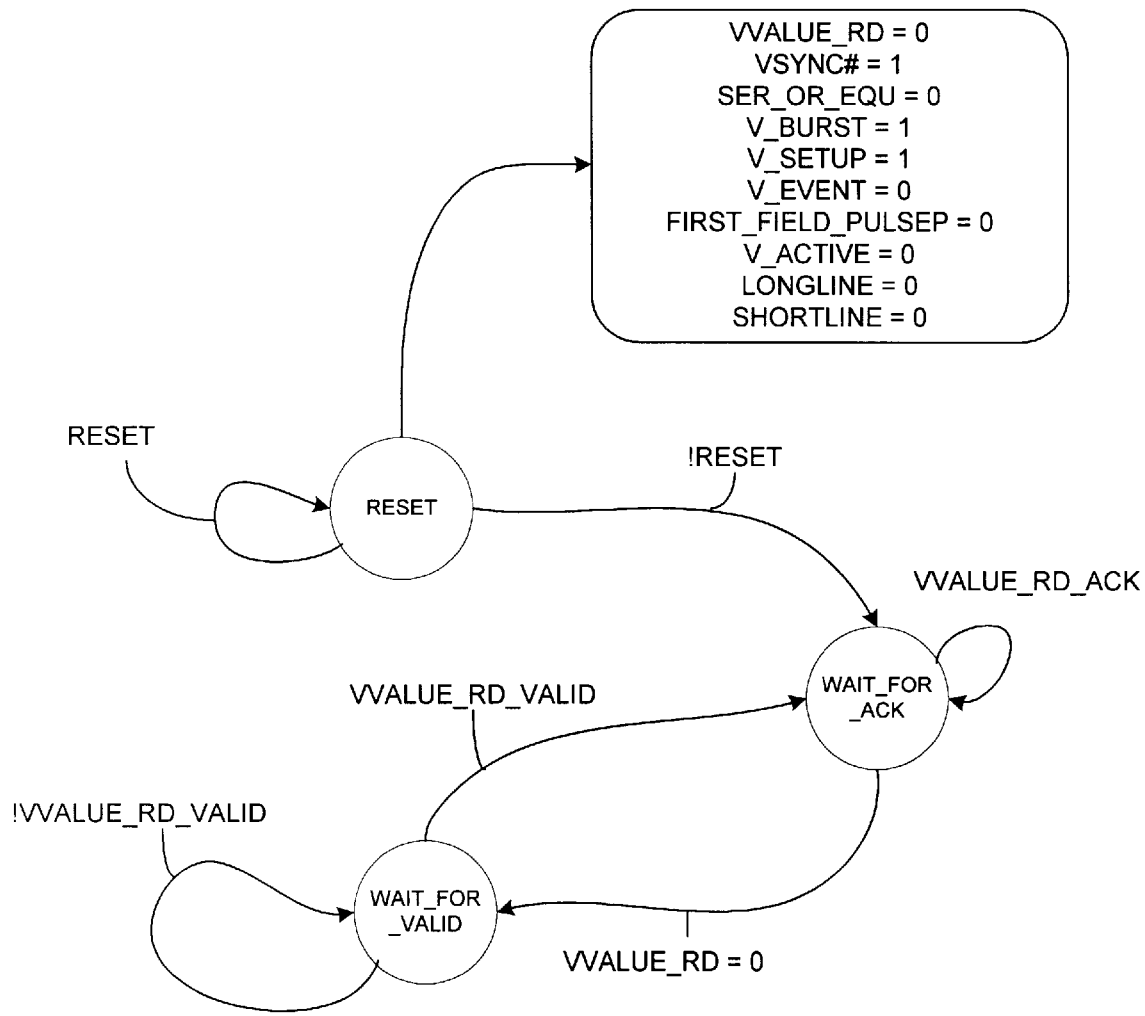
FIG. 16 is a state diagram illustrating operation of the vertical state machine of the timing generator.

As shown in FIG. 16, the vertical state machine 182 is placed in a state called RESET during reset of the graphics controller 97. In the state RESET, the vertical state machine 182 deasserts the signals 113b and deasserts the SHORTLINE and LONGLINE signals. After reset, the vertical state machine 182 transitions to a state called WAIT_FOR_ACK where the vertical state machine 182 processes one of the vertical timing codes 106. When the vertical counter is equal to "1," or the vertical state machine 182 has just come out of the RESET state, the vertical state machine 182 asserts the VVALUE_RD signal to initiate the process to retrieve the first vertical timing code 106 from the memory 104.

When subsequently the VVALUE_RD_ACK signal is asserted by the arbiter, the vertical state machine 182 transitions to a state called WAIT_FOR_VALID. Upon this occurrence, the vertical state machine 182 deasserts the VVALUE_RD signal. In the WAIT_FOR_VALID state, the vertical state machine 182 waits for the VVALUE_RD_VALID signal to be asserted, thereby indicating the next vertical time code 106 on the bus VDATAWORD[13:0]. When the VVALUE_RD_VALID signal is asserted, the vertical state machine 182 transitions back to the WAIT_FOR_ACK state to process another one of the timing codes 106.

Figure 17A:
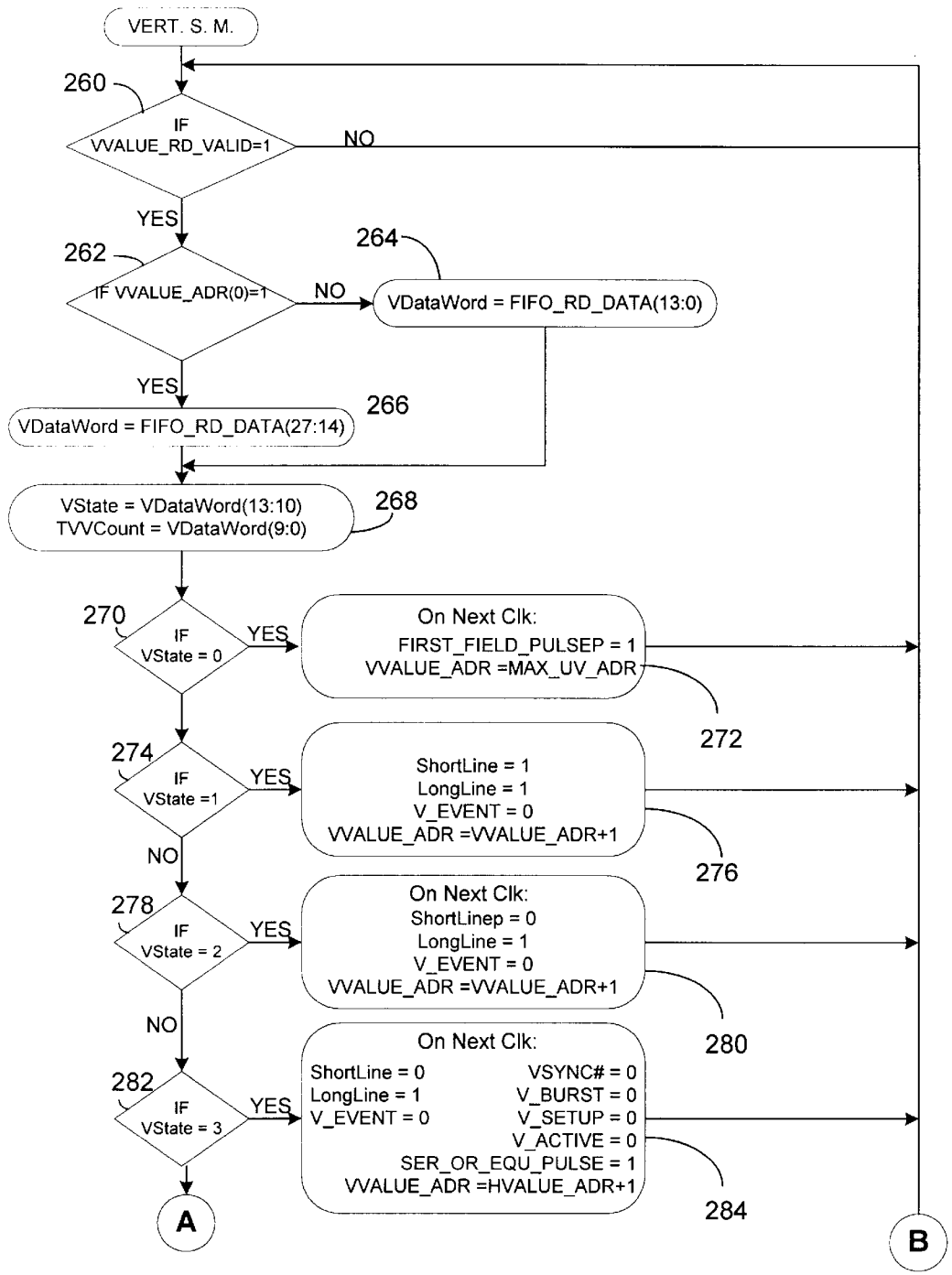
FIGS. 17A–C are a flow diagram illustrating operation of the vertical state machine of the timing generator.
Figure 17B:
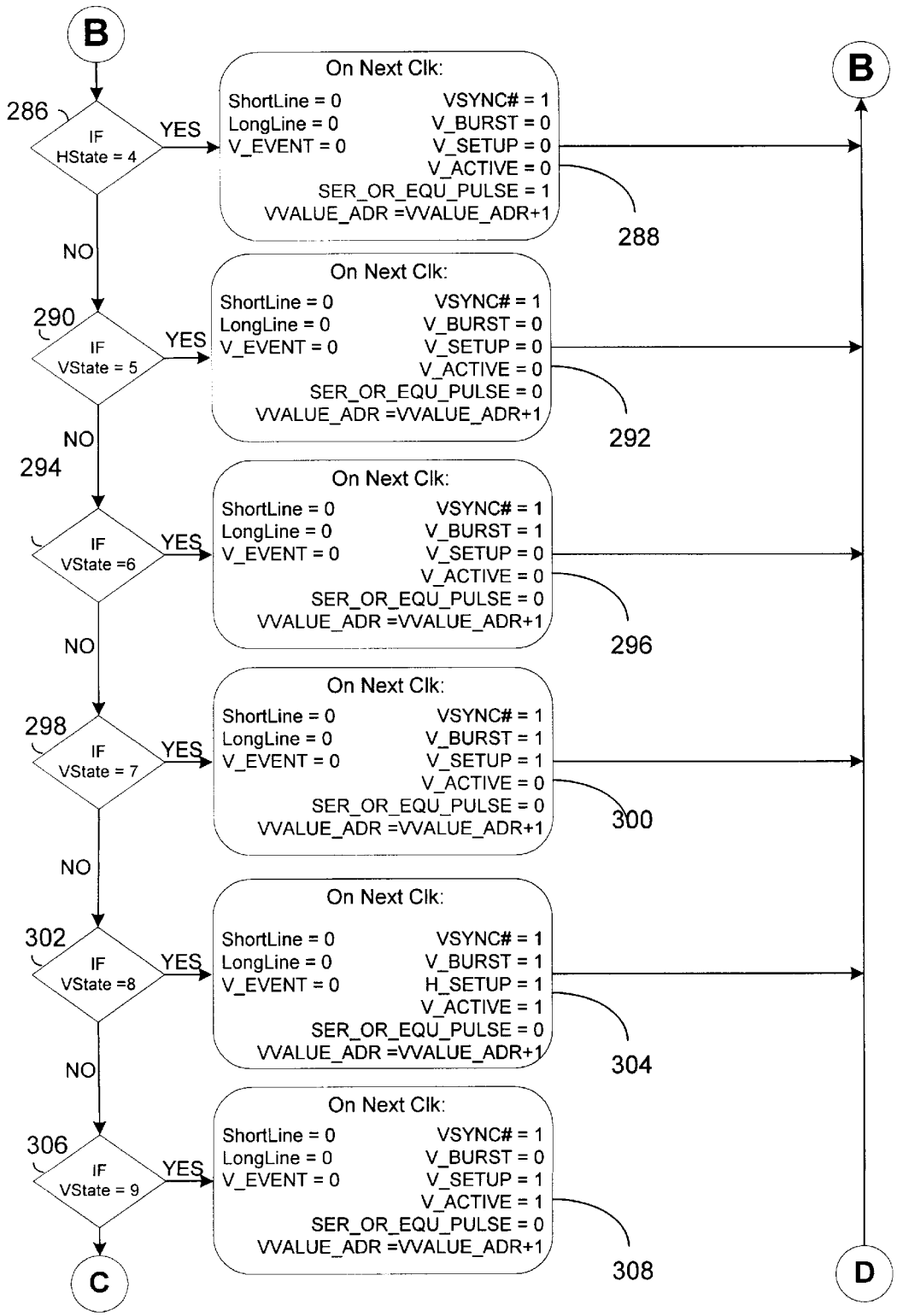
Figure 17C:
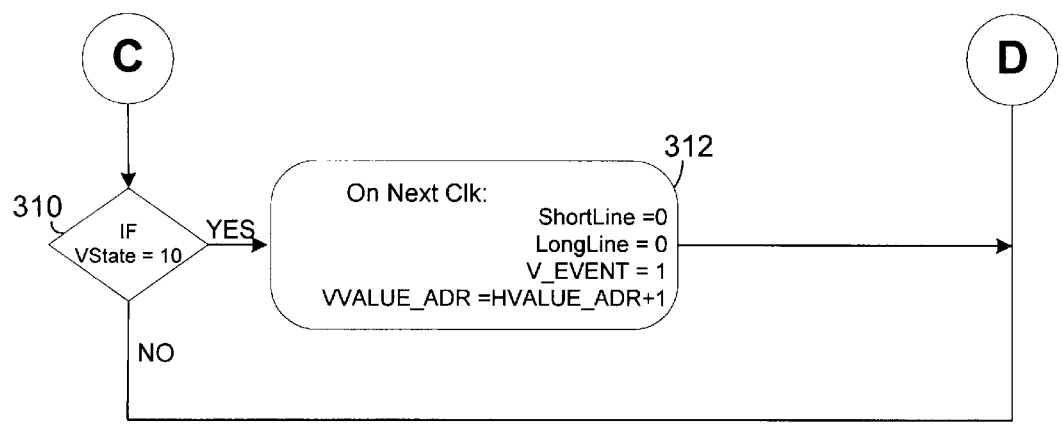

As shown in FIGS. 17A–17B, the vertical state machine 182 makes a series of logical decisions during the WAIT_FOR_ACK state to generate the signals 113b. The vertical state machine 160 first determines 260 whether the VVALUE_RD_VALID signal is asserted, and if not, the vertical state machine 182 returns to step 260. If the VVALUE_RD_VALID signal is asserted, then the vertical state machine 182 retrieves 262–266 the vertical timing code 106 from the bus RD_DATA[27:0]. The vertical state machine 182 then parses the fields 106a and 106b from the vertical timing code 106. If the vertical state machine 182 determines 270 that the vertical state is VSTATE0 (i.e., the end of the frame), then the vertical state machine 182 on the next clock cycle, sets 272 the VVALUE_ADR equal to MAX_UV_ADR[7:0] and asserts 272 the FIRST_FIELD_PULSEP signal.

If the vertical state machine determines 274 that the state is VSTATE1 (i.e., a shorter horizontal timing signal 35), then the vertical state machine 182 on the next clock cycle, deasserts 276 the LONGLINE signal and the V_EVENT signal; asserts 276 the SHORTLINE signal; and increments 276 the address represented by VVALUE_ADR[9:0].

If the vertical state machine 182 determines 278 that the vertical state is VSTATE2 (i.e., a longer than normal horizontal timing signal 35), then on the next clock cycle, the vertical state machine 182 deasserts 280 the SHORTLINE signal and V_EVENT signal; asserts 280 the LONGLINE signal; and increments 282 the address represented by VVALUE_ADR[9:0].

If the vertical state machine 180 determines 282 that the vertical state is VSTATE3 (i.e., the serration pulse signal 36), then on the next clock cycle, the vertical state machine 182 asserts 284 the VSYNC# signal, and the SER_OR_EQU_PULSE signal; deasserts 284 the V_BURST signal, the LONGLINE signal, the V_ACTIVE signal, the SHORT- LINE signal, the V_SETUP signal, and the V_EVENT signal; and increments 284 the address represented by VVALUE_ADR[9:0].

If the vertical state machine 182 determines 286 that the vertical state is VSTATE4 (i.e., the equalization pulse signal 37), the vertical state machine 182, on the next clock cycle, deasserts 288 the VSYNC# signal, the V_BURST signal, the V_SETUP signal, the V_ACTIVE signal, the SHORTLINE signal, the LONGLINE signal and the V_EVENT signal; asserts 288 the SER_OR_EQU_PULSE signal (to indicate equalization pulse signal 37); and increments 288 the address represented by VVALUE_ADR[9:0].

If the vertical state machine 182 determines 290 that the vertical state is VSTATE5, then on the next clock cycle, the vertical state machine 182 deasserts 292 the VSYNC# signal, the SER_OR_EQU_PULSE signal, the V_BURST signal, the V_SETUP signal, the V_ACTIVE signal, the SHORTLINE signal, the LONGLINE signal, and the V_EVENT signal; and increments 292 the address represented by VVALUE_ADR[9:0].

If the vertical state machine 182 determines 292 that the vertical state is VSTATE6, then on the next clock cycle, the vertical state machine 182 deasserts 296 the VSYNC# signal, the SER_OR_EQU_PULSE signal, V_SETUP signal, V_ACTIVE signal, the SHORTLINE signal, the LONGLINE signal, and V_EVENT signal; asserts 296 the V_BURST signal; and increments 296 the address represented by VVALUE_ADR[9:01].

If the vertical state machine 182 determines 298 that the vertical state is VSTATE7, then on the next clock cycle, the vertical state machine 182 deasserts 300 VSYNC# signal, the SER_OR_EQU_PULSE signal, the V_ACTIVE signal, the SHORTLINE signal, the LONGLINE signal, and the V_EVENT signal; asserts 300 the V_BURST signal and the V_SETUP signal; and increments 300 the address represented by VVALUE_ADR[9:0].

If the vertical state machine 182 determines 302 that the vertical state is VSTATE8, then on the next clock cycle, the vertical state machine 182 deasserts 304 the VSYNC# signal, the SER_OR_EQU_PULSE signal, the SHORTLINE signal, the LONGLINE signal, and the V_EVENT signal; asserts 304 V_BURST signal, the V_SETUP signal, and the V_ACTIVE signal; and increments 304 the address represented by VALUE_ADR[9:0].

If the vertical state machine 182 determines 306 that the vertical state is VSTATE9, then on the next clock cycle, the vertical state machine 182 deasserts 308 the VSYNC# signal, the V_BURST signal, the SER_OR_EQU_PULSE signal, the SHORTLINE signal, the LONGLINE signal, and the V_EVENT signal; asserts 308 the V_SETUP signal and the V_ACTIVE signal; and increments 308 the address represented by VVALUE_ADR[9:0].

If the vertical state machine 182 determines 310 that the vertical state is VSTATE0, then the vertical state machine 182, on the next clock cycle, deasserts 312 the SHORTLINE signal and the LONGLINE signal; asserts 312 V_EVENT signal; and increments 312 the address represented by VVALUE_ADR[9:0].

Other embodiments are within the scope of the following claims.

What is claimed is:

1. A timing generator for a video signal having at least two types of horizontal timing signals, the timing generator comprising:
   a first memory configured to store a horizontal timing code defining the at least two types of horizontal timing signals in a first horizontal region of a timing signal, the horizontal timing code includes a horizontal length indicator to indicate a duration of the first horizontal region, wherein the horizontal timing code defines a regular horizontal timing signal; and
   a sequencer coupled to the memory configured to generate the first horizontal region of at least one of the at least two types of horizontal timing signals based on the horizontal timing code, wherein the duration of the first horizontal region is determined by the horizontal length indicator.

2. The timing generator of claim 1, wherein the sequencer is further configured to generate at least one signal indicative of one of the types of horizontal timing signals.

3. The timing generator of claim 1, wherein the sequencer is further configured to generate at least one signal indicative of the appearance of one of the regions in the video signal.

4. The timing generator of claim 1, wherein the horizontal timing code defines regions for at least three types of horizontal timing signals.

5. The timing generator of claim 1, wherein the horizontal timing code defines a serration pulse signal.

6. The timing generator of claim 1, wherein the horizontal timing code defines an equalization pulse signal.

7. The timing generator of claim 1 wherein the horizontal timing code includes a state indicator for indicating one of a plurality of states, the plurality of states includes:
   a first state for indicating when the first horizontal region is at a blanking level;
   a second state for indicating when the first horizontal region is a color burst region; and
   a third state for indicating when the first horizontal region is an active region.

8. The timing generator of claim 7 wherein plurality of states further includes:
   a fourth state for indicating when the first horizontal region is at a synchronization level.

9. The timing generator of claim 1 wherein the horizontal timing code includes a state indicator for indicating one of a plurality of states, the plurality of states includes:
   a first state for indicating when the first horizontal region is to maintain a previous state.

10. The timing generator of claim 1 further comprising:
    a second memory location configured to store a vertical timing code defining a vertical timing signal in a first vertical region of the vertical timing signal, the vertical timing code includes a length indicator to indicate a duration of the first vertical region.

11. The timing generator of claim 10, wherein the first memory location is one of a first plurality of consecutive memory locations each storing a horizontal timing code, and the second memory location is one of a second plurality of consecutive memory locations each storing a vertical timing code.

12. A method of generating a video signal having at least two different types of horizontal timing signals, the method comprising:
    storing a horizontal timing code in a memory, the horizontal timing code defining state information for the at least two different types of horizontal timing signals, wherein one of the horizontal timing code's timing signals is a regular horizontal timing signal;
    stepping through the horizontal timing code to generate at least one signal indicative of the timing of at least one of the at least two different types of horizontal timing signals.

13. The method of claim 12, further comprising generating at least one signal indicative of one of the types of horizontal timing signals.

14. The method of claim 12, further comprising generating at least one signal indicative of the appearance of one of the regions in the video signal.

15. The method of claim 12 further comprising the step of:
storing a vertical timing code, wherein the vertical timing code at least partially defines the timing of the horizontal timing signal, and has a vertical length indicator indicating the duration of the timing code; and
wherein the step of storing the horizontal timing code further comprises the horizontal timing code having a horizontal length indicator indicating the duration of the horizontal timing code; and
wherein the step of stepping further comprises stepping through the vertical timing code.

16. A timing generator for a video signal having at least two types of horizontal timing signals, the timing generator comprising:
a first memory configured to store a horizontal timing code defining the at least two types of horizontal timing signals in a first horizontal region of a timing signal, the horizontal timing code includes a horizontal length indicator to indicate a duration of the first horizontal region;
a sequencer coupled to the memory configured to generate the first horizontal region of at least one of the at least two types of horizontal timing signals based on the horizontal timing code, wherein the duration of the first horizontal region is determined by the horizontal length indicator; and
a second memory location configured to store a vertical timing code defining a vertical timing signal in a first vertical region of the vertical timing signal, the vertical timing code includes a length indicator to indicate a duration of the first vertical region, wherein the vertical timing code includes a vertical state indicator to indicate one of a plurality of vertical states and a current horizontal signal generated based on the vertical state indicator.

17. The timing generator of claim 16, wherein the plurality of vertical states includes:
a first vertical state to indicate that the current horizontal signal is a regular horizontal timing signal having a plurality of regions including a setup region, a color burst region, and an active region, wherein the regular horizontal timing signal is one of the at least two types of horizontal timing signals; and
a second vertical state to indicate the regular horizontal timing signal having a plurality of regions including a setup region, color burst region and without an active region.

18. The timing generator of claim 17, wherein the plurality of vertical states further includes:
a third vertical state to indicate the current horizontal signal is a serration pulse signal, wherein the serration pulse signals one of the at least two types of horizontal timing signals.

19. The timing generator of claim 17, wherein the plurality of vertical states further includes:
a fourth vertical state to indicate the current horizontal signal is an equalization pulse signal, wherein the equalization pulse signals one of the at least two types of horizontal timing signals.

* * * * *